(12) United States Patent
Thomeer et al.

(10) Patent No.: US 6,333,700 B1
(45) Date of Patent: Dec. 25, 2001

(54) APPARATUS AND METHOD FOR DOWNHOLE WELL EQUIPMENT AND PROCESS MANAGEMENT, IDENTIFICATION, AND ACTUATION

(75) Inventors: Hubertus V. Thomeer, Houston; Sarmad Adnan, Sugar Land, both of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/536,953

(22) Filed: Mar. 28, 2000

(51) Int. Cl.$^7$ ............................................ G01V 3/00
(52) U.S. Cl. .................. 340/854.8; 340/825.72; 340/572.7; 340/539; 340/853.1; 166/254.2; 166/255.1; 342/42; 705/65
(58) Field of Search ............... 340/854.6, 853.8, 340/859.1, 854.8, 539, 572.7, 572.1, 572.2, 10.42, 825.72; 166/254.2, 255.1; 342/42; 705/65

(56) References Cited

U.S. PATENT DOCUMENTS

| | | | |
|---|---|---|---|
| 4,023,167 | * | 5/1977 | Wahlstrom ............................ 352/42 |
| 4,572,293 | * | 2/1986 | Wilson ............................ 166/250.01 |
| 4,630,044 | * | 12/1986 | Polzer ............................ 340/825.72 |
| 4,656,463 | * | 4/1987 | Anders ............................ 340/573.4 |
| 4,808,925 | * | 2/1989 | Baird ............................ 324/221 |

(List continued on next page.)

FOREIGN PATENT DOCUMENTS

| | | | |
|---|---|---|---|
| 13494 | * | 7/1980 | (EP) . |
| 412535 | * | 5/1994 | (EP) . |
| 651132 | * | 5/1995 | (EP) . |
| 730083 | * | 2/1996 | (EP) . |
| 0972909 | | 7/1999 | (EP) . |
| WO 00/60780 | * | 10/2000 | (WO) . |

OTHER PUBLICATIONS

David Lord, David Anderson, "CTD System Allows Simultaneous Offshore Operations; Shell U.K. Exploration and Production's Coiled Tubing System", Feb. 1998, No. 2, vol. 219, p. 123.

TIRIS Transponders Catalog, Copyright 1998 Texas Instruments Inc.

TIRIS Readers and Antennas Catalog, Copyright 1998 Texas Instruments Inc.

*Primary Examiner*—Michael Horabik
*Assistant Examiner*—Albert K. Wong
(74) *Attorney, Agent, or Firm*—Robin C. Nava

(57) ABSTRACT

A method for actuating or installing downhole equipment in a wellbore employs non-acoustic signals (e.g., radio frequency signals) to locate, inventory, install, or actuate one downhole structure in relation to another downhole structure. The method comprises the steps of: (a) providing a first downhole structure that comprises a non-acoustic (e.g., radio frequency) identification transmitter unit that stores an identification code and transmits a signal corresponding to the identification code; (b) providing a second downhole structure that comprises a non-acoustic receiver unit that can receive the signal transmitted by the non-acoustic identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore; (c) placing the second downhole structure in close enough proximity to the first downhole structure so that the non-acoustic receiver unit can receive the signal transmitted by the non-acoustic identification transmitter unit; (d) comparing the identification code determined by the non-acoustic receiver unit to the target identification code; and (e) if the determined identification code matches the target identification code, actuating or installing one of the first downhole structure or second downhole structure in physical proximity to the other.

48 Claims, 11 Drawing Sheets

U.S. PATENT DOCUMENTS

| | | | | |
|---|---|---|---|---|
| 4,827,395 | * | 5/1989 | Anders | 700/9 |
| 5,279,366 | * | 1/1994 | Scholes | 166/254.2 |
| 5,361,838 | * | 11/1994 | Kilgore | 166/254.2 |
| 5,457,447 | * | 10/1995 | Ghaem | 340/10.42 |
| 5,495,237 | * | 2/1996 | Yuasa | 340/854.6 |
| 5,497,140 | * | 3/1996 | Tuttle | 340/10.1 |
| 5,626,192 | * | 5/1997 | Connell | 166/255.1 |
| 5,680,143 | * | 10/1997 | Brady | 340/572.7 |
| 5,680,459 | * | 10/1997 | Hook | 705/65 |
| 5,720,345 | * | 2/1998 | Price | 166/254.2 |
| 5,995,449 | * | 11/1999 | Green | 367/83 |
| 6,025,780 | * | 2/2000 | Bowers | 340/572.3 |
| 6,026,911 | | 2/2000 | Angle et al. | 175/24 |
| 6,078,259 | * | 6/2000 | Brady | 340/572.7 |
| 6,151,961 | * | 11/2000 | Huber | 73/152.54 |

* cited by examiner

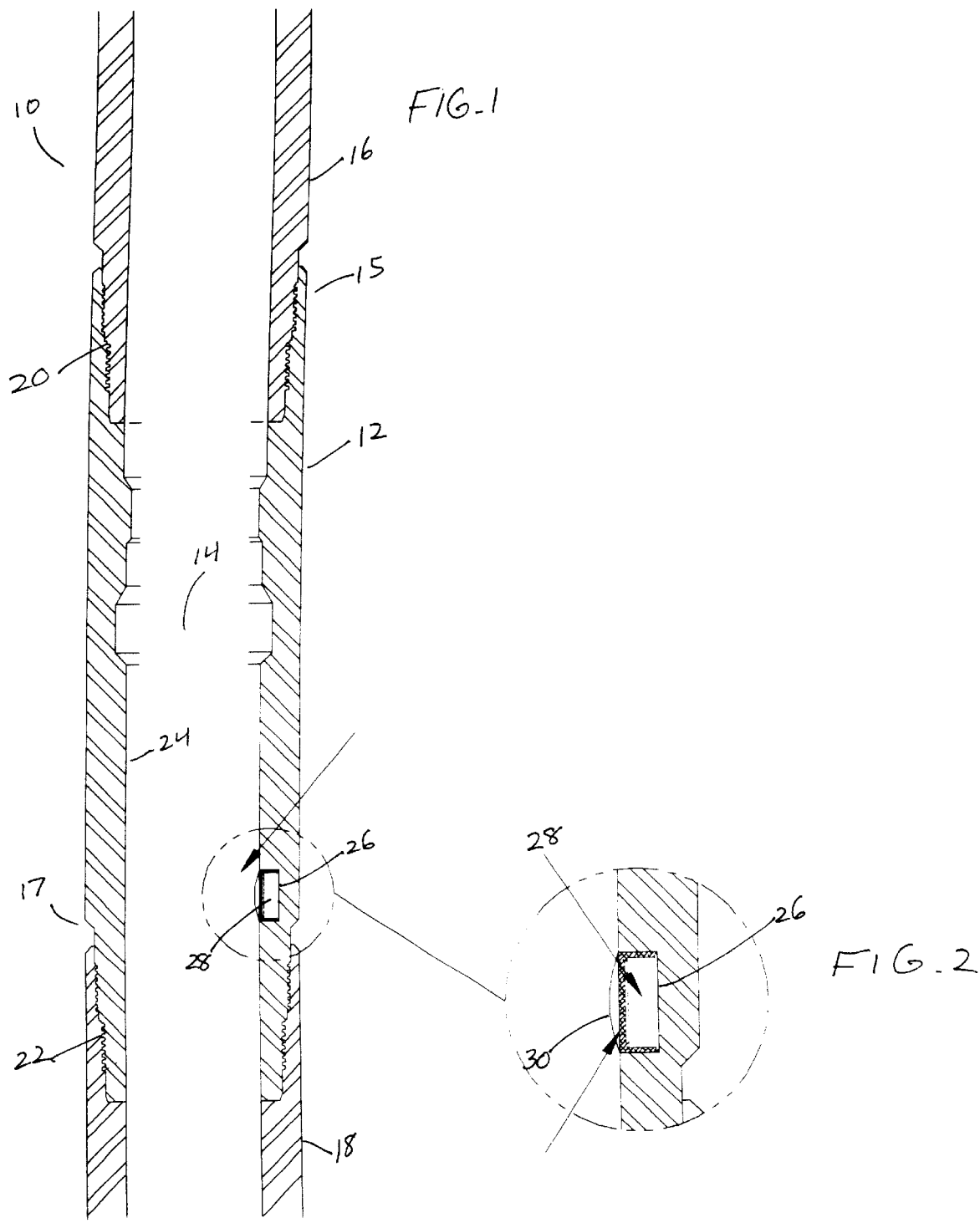

FIG. 4
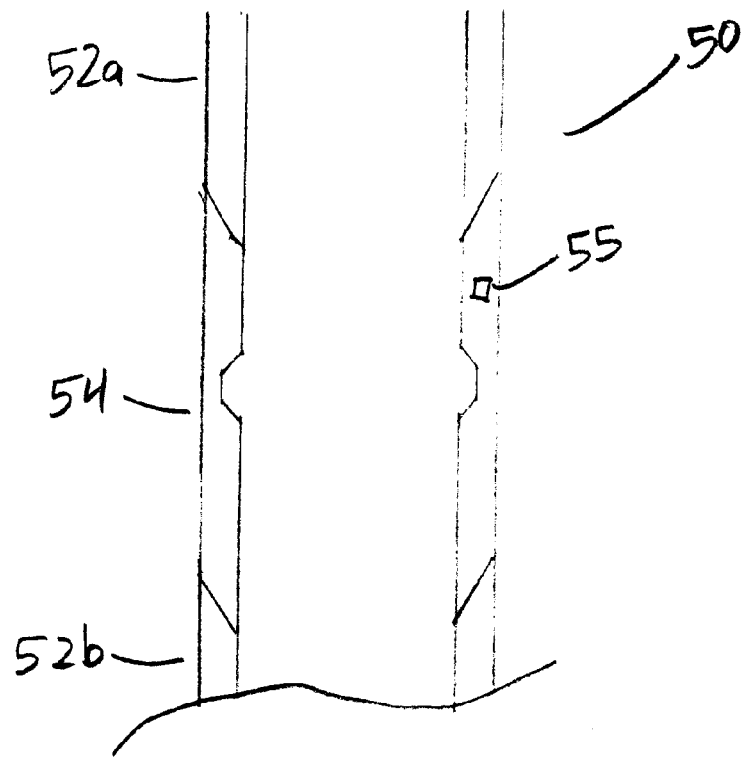
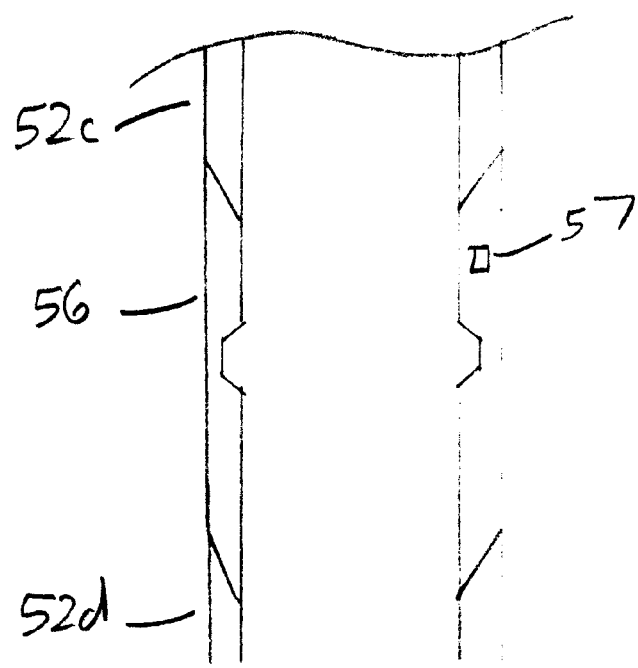

APPARATUS AND METHOD FOR DOWNHOLE WELL EQUIPMENT AND PROCESS MANAGEMENT, IDENTIFICATION, AND ACTUATION

TECHNICAL FIELD OF THE INVENTION

This invention relates to the equipment and methods used in the drilling and completion of wells, such as oil and gas wells, and in the production of fluids from such wells.

BACKGROUND OF THE INVENTION

Hydrocarbon fluids such as oil and natural gas are obtained from a subterranean geologic formation (i.e., a "reservoir") by drilling a well that penetrates the hydrocarbon-bearing formation. Once a wellbore has been drilled, the well must be "completed" before hydrocarbons can be produced from the well. A completion involves the design, selection, and installation of tubulars, tools, and other equipment that are located in the wellbore for the purpose of conveying, pumping, or controlling the production or injection of fluids. After the well has been completed, production of oil and gas can begin.

Each of these phases (drilling, completion, and production) make use of a complex variety of equipment, including tubular members such as casing, production tubing, landing nipples, and gas lift mandrels; flow control devices such as gas lift valves, subsurface safety valves, and packers; and other equipment, such as perforation guns. In many situations it is necessary to lower one piece of equipment into the well so that it can be installed into a particular location in the wellbore (e.g., installing a gas lift valve in a particular gas lift mandrel when there may be several gas lift mandrels at different depths in the wellbore), or alternatively can perform a desired action at a desired location (e.g., a perforating gun that uses shaped charges to create holes in well casing at a particular depth in the well).

In the past, rather complex means have been used to determine when a given piece of downhole equipment is in the desired location in the wellbore. These methods have often been imprecise, complex, and expensive. For example, a wireline retrievable subsurface safety valve can be lowered into a wellbore on a wireline to be installed in a particular landing nipple. If multiple landing nipples are located in the wellbore, generally the uppermost one must have the largest inner diameter, and each succeeding lower nipple must have a smaller inner diameter, so that the valve may be placed at the desired depth in the well. This requires the use of multiple sizes (i.e., inner diameters) of landing nipples, as well as corresponding sizes of safety valves. Thus, while this technique for installing and/or activating downhole tools in a wellbore works, it can be complex and cumbersome in certain instances.

There is a long-standing need for more intelligent and adaptable methods of drilling and completing wells and of producing fluids therefrom.

SUMMARY OF THE INVENTION

The present invention relates to a method for actuating, installing, or inventorying downhole equipment in a wellbore. This method comprises providing a first downhole structure that comprises a non-acoustic identification transmitter unit that stores an identification code and transmits a non-acoustic signal (e.g., a frequency signal, such as a radio frequency signal) corresponding to the identification code. Also provided is a second downhole structure that comprises a non-acoustic receiver unit that can receive the non-acoustic signal transmitted by the non-acoustic identification transmitter unit, decode the non-acoustic signal to determine the identification code corresponding thereto, and compare the identification code to a target identification code. One of the first downhole structure and the second downhole structure is secured at a given location in a subterranean wellbore, and the other is movable in the wellbore. The second downhole structure is placed in close enough proximity to the first downhole structure so that the receiver unit can receive the signal transmitted by the identification transmitter unit. It then compares the identification code determined by the receiver unit to the target identification code. If the determined identification code matches the target identification code, then one of the first downhole structure or second downhole structure is actuated, managed, classified, identified, controlled, maintained, actuated, activated, deactivated, located, communicated, reset, or installed. For example, the second downhole structure can be installed inside the first downhole structure.

The present invention also relates to apparatus that can be used in the above-described method. Such apparatus is described in more detail below.

Another aspect of the invention is a method of inventorying downhole equipment, and storing and retrieving identification codes for the inventoried equipment, as well as an inventory of services performed on the well. This method allows an operator to create a database of the identification codes of the pieces of equipment in the well and the location and/or orientation of each such piece of equipment, and/or the equipment in which it is installed, and/or the services performed on the well. With such a database, an operator could determine the equipment profile of a well and plan out the downhole tasks before arriving on-site.

One embodiment of this method comprises the steps of: (a) providing in a wellbore a plurality of first downhole structures having non-acoustic identification transmitter units therein; (b) passing at least one second downhole structure through at least a part of the wellbore in proximity to a plurality of the non-acoustic identification transmitter units, wherein the second downhole structure comprises a non-acoustic receiver unit that receives the non-acoustic signal transmitted by the identification transmitter units, decodes the signals to determine the identification codes corresponding thereto, and stores the identification codes in memory.

This method can further comprise the step of creating a database for the well, the database comprising the stored identification codes. The method can also comprise reading from the database the identification codes for the well (e.g., the codes for equipment located in the well and/or the codes for services performed on the well). The identification codes read from the database can be used to perform at least one operation selected from the group consisting of managing, classifying, controlling, maintaining, actuating, activating, deactivating, locating, and communicating with at least one downhole structure in the well.

The present invention has several benefits over prior art apparatus and methods. It provides a way of selectively installing, actuating, or inventorying downhole equipment at a desired time and/or at a desired location, at lower cost and with greater flexibility than in prior art techniques.

Another benefit of the present invention lies in the reduction of downhole tool manipulation time. In some cases, considerable downhole manipulation is done to ensure that a tool is at the right point on the downhole jewelry or that the right action is performed. This time and effort can be eliminated or at least reduced by the present invention's ability to actuate or manipulate only when at the right point. A tool of the present invention can sense this based on the presence of the non-acoustic serial number information.

BRIEF DESCRIPTION OF THE INVENTION

FIG. 1 is a side cross-sectional view of a tubing string comprising a landing nipple in accordance with the present invention.

FIG. 2 is a side cross-sectional view of the non-acoustic frequency identification transmitter unit of FIG. 1.

FIG. 4 is a side cross-sectional view of a tubing string comprising a plurality of landing nipples in accordance with the present invention.

DETAILED DESCRIPTION OF PREFERRED EMBODIMENTS

Figure 3:
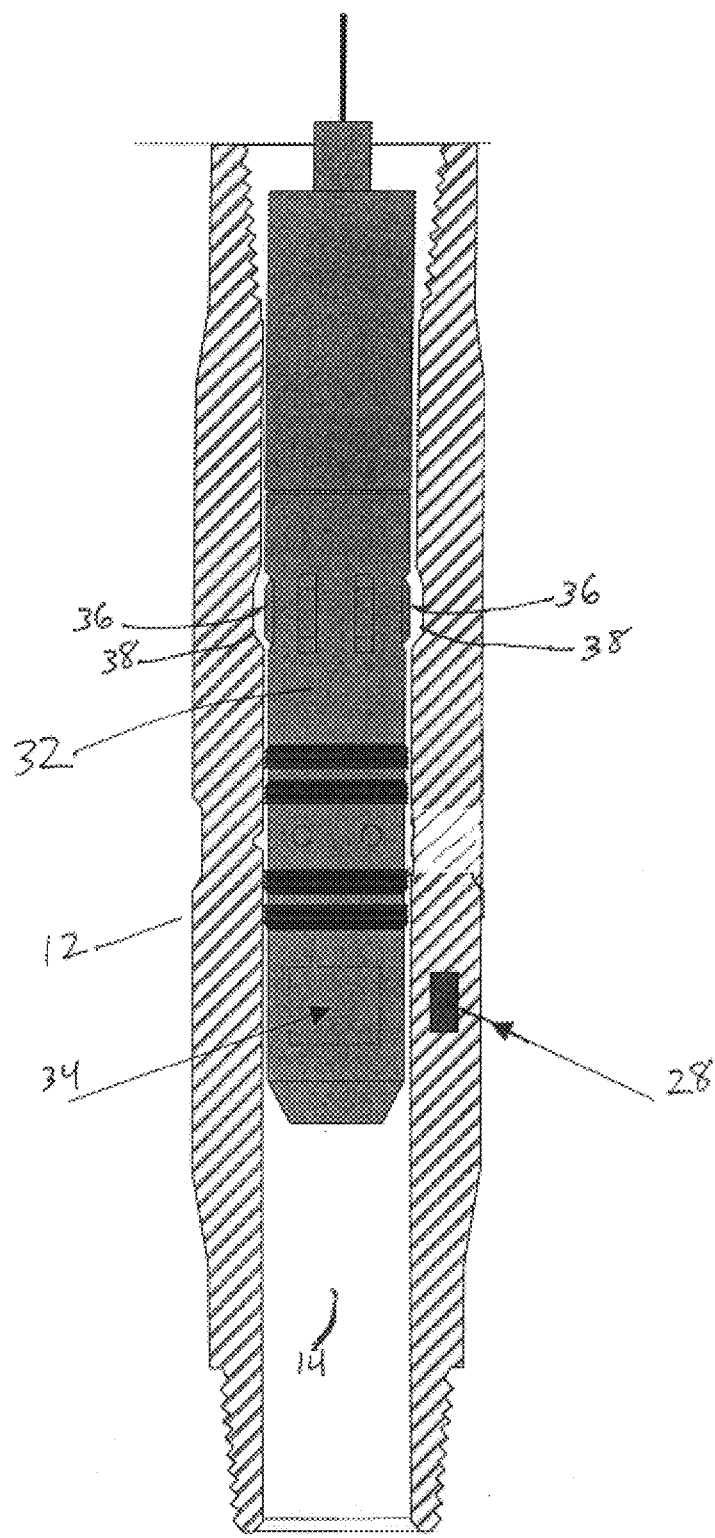
FIG. 3 is a cross-sectional view of a downhole tool in place in a landing nipple in accordance with the present invention.

The present invention makes use of non-acoustic transmission, such as radio frequency transmission, optical transmission, tactile transmission, or magnetic transmission of at least one identification code to locate, install, actuate, and/or manage downhole equipment in a subterranean wellbore. FIG. 1 shows one embodiment of the invention. A segment of a tubing string 10 includes a first downhole structure 12, which in this embodiment is a landing nipple that has a hollow axial bore 14 therethrough. The landing nipple 12 is attached at its upper end 15 to an upper tubular member 16, and at its lower end 17 to a lower tubular member 18, by threaded connections 20 and 22. The landing nipple 12 has an inner diameter 24 that is defined by the inner surface of the nipple wall. A recess 26 is formed in the inner surface of the nipple wall, and a non-acoustic transmitter unit, in this case a radio frequency identification transmitter unit 28, is secured therein. The non-acoustic frequency identification transmitter unit 28, which is shown in more detail in FIG. 2, stores an identification code and transmits a radio frequency signal corresponding to the identification code. The landing nipple 12 can be made of any material suitable for downhole use in a well, such as steel. A cap 30, which for example can comprise steel or a ceramic or composite material such as resin coated fibers can overlay the frequency identification transmitter unit 28 and preferably physically seal it from contact with well fluids. However, it should be understood that absence of contact between well fluids and the frequency identification transmitter unit is not critical to the invention. The cap 30 is not essential.

FIG. 3 shows a second downhole structure 32, in particular a wireline lock, which is adapted to work in conjunction with the landing nipple 12 of FIG. 1. This second downhole structure comprises a non-acoustic frequency receiver unit 34, in this case a radio frequency receiver unit, that receives frequency signals, such as the one transmitted by the frequency identification transmitter unit 28. The receiver unit decodes the non-acoustic frequency signal to determine the identification code corresponding thereto, and compares the identification code to a preset target identification code.

As shown in FIG. 3, when the second downhole structure 32 is placed in close enough proximity to the first downhole structure 12 in the wellbore, the non-acoustic frequency receiver unit 34 receives the non-acoustic frequency signal transmitted by the identification transmitter unit 28, decodes that signal to determine the identification code, and compares the determined identification code to the target code. If the determined identification code matches the target identification code, the first downhole structure is actuated or installed in the desired physical proximity to the second downhole structure (or vice versa). In particular, locking tabs 36 are extended outwardly into corresponding locking recesses 38 in the inner diameter of the second downhole structure.

FIGS. 1, 2, and 3 show the first downhole structure (e.g., the landing nipple 12) as being secured at a given location in a subterranean wellbore, by connection to a tubing string. In those figures, the second downhole structure (e.g., a tool such as a lock with flow control device or a depth locator) is movable along the axial bore of the well. However, it should be appreciated that this is only one embodiment of the invention. It would also be possible to have the first downhole structure (with the frequency identification transmitter unit therein) movable relative to the wellbore, and the second downhole structure (with the frequency receiver unit therein) secured at a fixed position in the wellbore.

Suitable non-acoustic frequency identification transmitter units are commercially available. Suitable examples of radio frequency transmitter units include the Tiris transponders, available from Texas Instruments. These radio frequency identification transmitter units are available in hermetically sealed glass capsules having dimensions of approximately 31×4 mm, emit a radio frequency signal at about 134.2 kHz that can be read up to about 100 cm away, and can comprise a 64 bit memory. Of course, this is only one possible embodiment, and larger or smaller memories can be used, as well as other frequencies, sizes, package configurations, and the like. Suitable non-acoustic frequency receiver units are also commercially available, such as the Tiris radio frequency readers and antennas from Texas Instruments.

Tiris transponders, available from Texas Instruments, are adapted to store a multi-bit code, for example, a digital code of 64 bits. The transponder itself will typically include a coil, a chip storing the multi-bit code, and associated circuitry. The transponders are generally of three types. The first type is preprogrammed by the manufacturer with a preselected multi-bit code. A second type would be sold by the manufacturer in an unprogrammed state, and the end user may program the multi-bit code permanently into the transponder. A third type may be programmed initially and then reprogrammed many times thereafter with different multi-bit codes. In the presently preferred embodiment, the transponder is programmed one time permanently, either by the manufacturer or by the end user. The multi-bit code in such a device may not be changed for the life of the transponder. In another embodiment of the present invention, a reprogrammable transponder may be used to advantage. For example, after the transponder is placed downhole, its multi-bit code may be updated to reflect certain information. For example, a transponder associated with a downhole valve may have its multi-bit code updated each time the valve is actuated to reflect the number of times the valve has been actuated. Or, by way of further example, the multi-bit code may be updated to reflect the status of the valve as being in an open or closed position.

Tiris radio frequency readers and antennae, also available from Texas Instruments, may be used to read the multi-bit code stored in a Tiris transponder. The reader/antenna is typically powered by battery, although it may be powered by way of a permanent power source through a hardwire connection. The reader/antenna generates a radio signal of a certain frequency, the frequency being tuned to match the coil in the transponder. The radio signal is transmitted from the reader/antenna to the transponder where power from the signal is inducted into the coil of the transponder. Power is stored in the coil and is used to generate and transmit a signal from the transponder to the reader/antenna. Power is stored in the coil of the transponder for a very short period of time, and the reader/antenna must be prepared to receive a return signal from the transponder very quickly after first transmitting its read signal to the transponder. Using the power stored in the coil, the transponder generates a signal representative of the multi-bit code stored in the transponder and transmits this signal to the reader/antenna. The reader/antenna receives the signal from the transponder and processes it for digital decoding. The signal, or its decoded counterpart, may then be transmitted from the reader antenna to any selected data processing equipment.

In an alternative embodiment of the present invention, as mentioned just above, the multi-bit code stored in a transponder may be updated and rewritten while the transponder is downhole. For example, a reader/antenna unit may be used to read the multi-bit code from a transponder downhole and, if desired, the code stored in the transponder may then be updated by way of a write signal to the reprogrammable transponder.

In many embodiments of the invention, the first downhole structure will comprise a tubular member having a hollow axial bore. The non-acoustic frequency identification transmitter unit preferably is secured to this tubular member, for example in a recess in the wall of the tubular member, as shown in FIG. 1. The frequency identification transmitter unit preferably is imbedded in the tubular member (i.e., sunk into a space in the member, so that the surface of the tubular member is not substantially affected, as opposed to attaching the unit to an exterior surface of the tubular member whereby it would create a substantial protrusion on that surface). Suitable examples of such tubular members include landing nipples, gas lift mandrels, packers, casing, external casing packers, slotted liners, slips, sleeves, guns, and multilaterals.

In one preferred embodiment of the invention, two or more first downhole structures are secured at different depths in a subterranean wellbore. As shown in FIG. 4, a tubing string 50 can include joints of production tubing 52a, 52b, 52c, and 52d. Attached to these joints of tubing are a first landing nipple 54 and a second landing nipple 56, with frequency identification transmitter units 55 and 57 secured thereto. When a second downhole structure (e.g., a wireline retrievable subsurface safety valve) is lowered through the tubing string, it will detect and determine the identification code of each nipple 54 and 56. If it detects an identification code that does not match its target code, it will not actuate, and thus can continue to be lowered in the bore. When it detects an identification code that does match its target code, it will actuate, thus allowing the safety valve to be selectively installed/actuated at a desired located in the wellbore.

Figure 5:
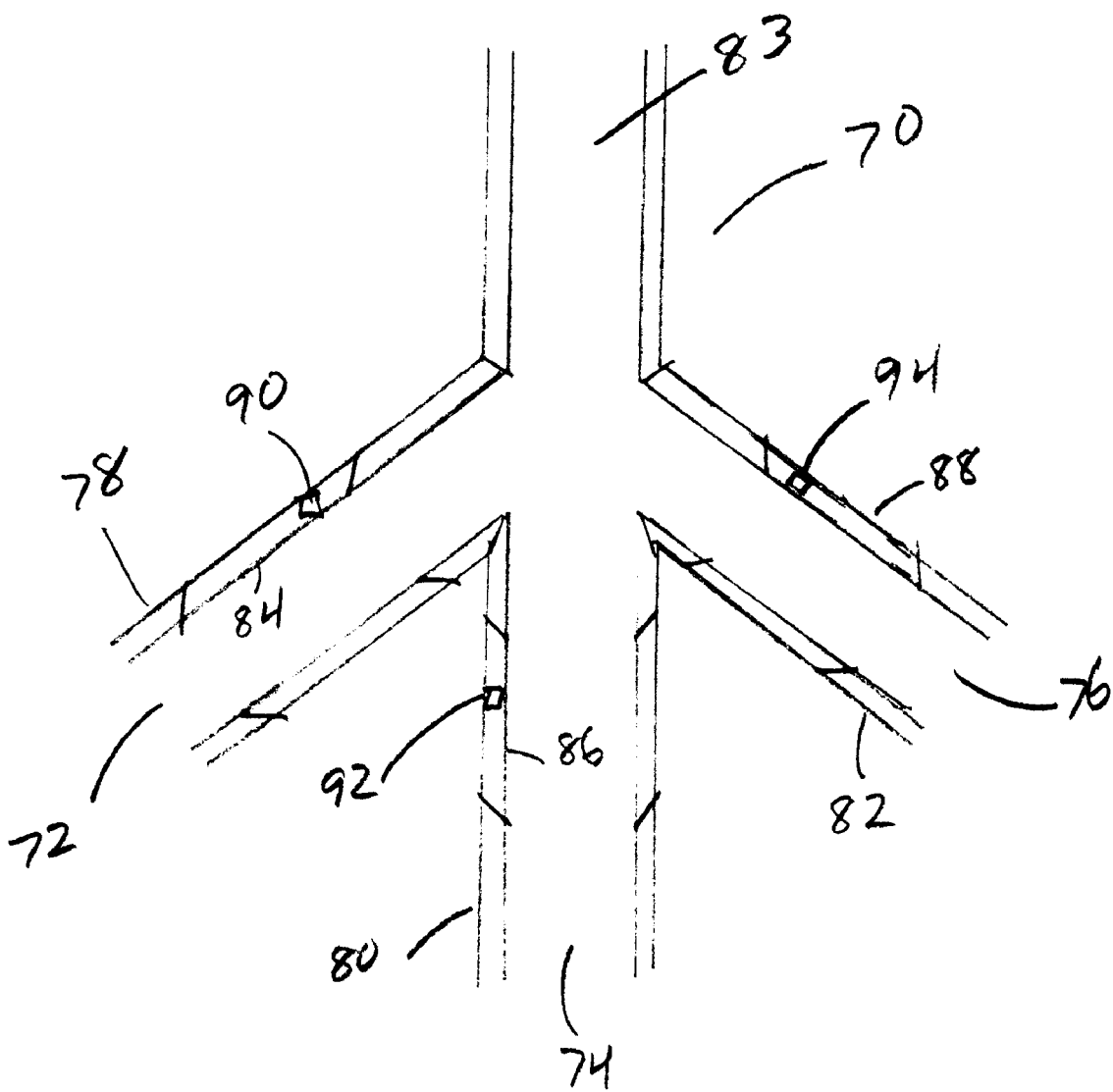
FIG. 5 is a side cross-sectional view of a multilateral well having a plurality of lateral boreholes, and apparatus and accordance with the present invention.

Another embodiment of the invention, shown in FIG. 5, is particularly useful in a multilateral well 70 that has a plurality of lateral bores 72, 74, and 76. Each of these lateral bores is defined by a lateral tubing string 78, 80, and 82 branching off from a main borehole 83. Each of these tubing strings comprises at least one first downhole structure (e.g., landing nipples 84, 86, and 88, each having radio frequency identification transmitter units 90, 92, and 94 secured therein) secured in a fixed, given location in the respective lateral borehole. When the second downhole structure (e.g., a wireline retrievable subsurface safety valve) is lowered down through the tubing string and into one of the laterals, the radio frequency receiver unit therein will detect the radio frequency signal emitted by the transmitter in any nipple within range, and will thus determine the identification code of each such nipple as is passes close to the nipple. By providing the transmitter units in the different lateral boreholes with different ID codes, this embodiment allows a determination of which lateral borehole the valve has entered.

As mentioned above, suitable second downhole structures can be, for example, subsurface safety valves, as well as gas lift valves, packers, perforating guns, expandable tubing, expandable screens, flow control devices, and other downhole tools. Other second downhole structures can include, among others, perforations, fractures, and shut-off zones, in which the transmitter is placed during well stimulation (such as fracturing) or well intervention (such as perforation) operations.

Figures 6A, 6B:
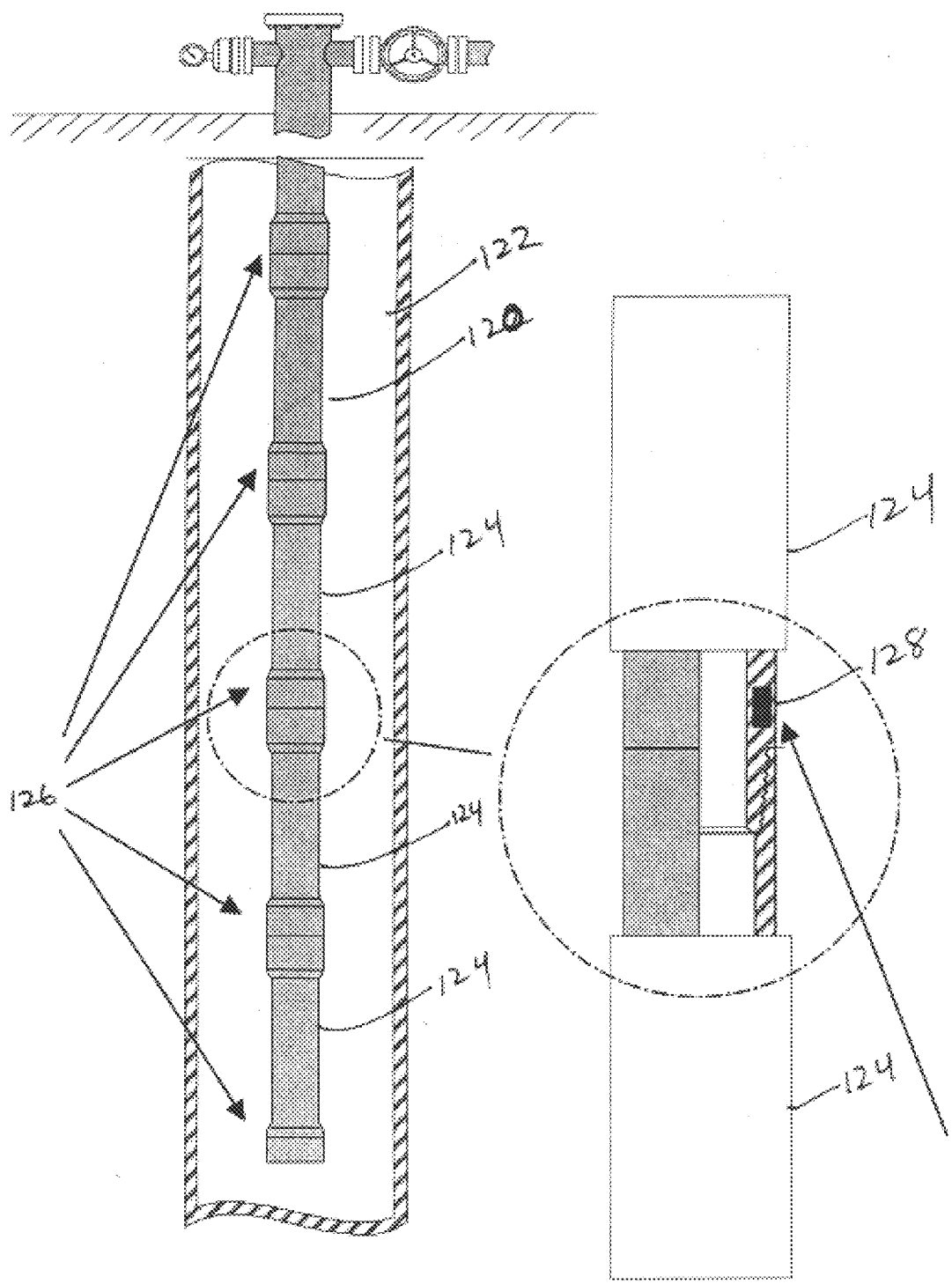
FIG. 6A is a cross-sectional view of a well containing apparatus, including a tubing string, in accordance with the present invention.
FIG. 6B is a cross-sectional view of two connected joints of tubing, one of those joints comprising a transmitter in accordance with the present invention.

Another use for the present invention involves determining the depth at which a downhole tool is located. In this embodiment, a tubing string will include two or more first downhole structures that are located at different depths in a wellbore. These first downhole structure could suitably be landing nipples, or they could simply be tubing joints having a transmitter unit mounted thereon or embedded therein. As shown in FIG. 6A, a tubing string 120 in a well 122 comprises a plurality of joints 124 of tubing, each connected to the next end-to-end by a threaded connection. At one end 126 of each joint (or at least in the ends of a plurality of joints), a radio frequency identification transmitter unit (not visible in FIG. 6A) is embedded in the wall of the tubing.

FIG. 6B shows the placement of the transmitter unit 128 in the wall of a tubing joint 124. Therefore, the known length of each tubing joint and the transmitter unit at the end of each joint, with a unique identification code, permits relatively precise assessment of the depth at which the secondary structure is located. Thus, the identification codes of the various first downhole structures in effect correlate to the depth at which each is installed, and the ID codes detected by the second downhole structure as it is lowered through the borehole will provide an indication of the depth of the second downhole structure.

A similar use of the present invention determines depth as described in the previous paragraph as a way of determining when a perforating gun (as the second downhole structure) is at the desired depth at which it should be fired to perforate tubing and/or casing.

Figure 7A:
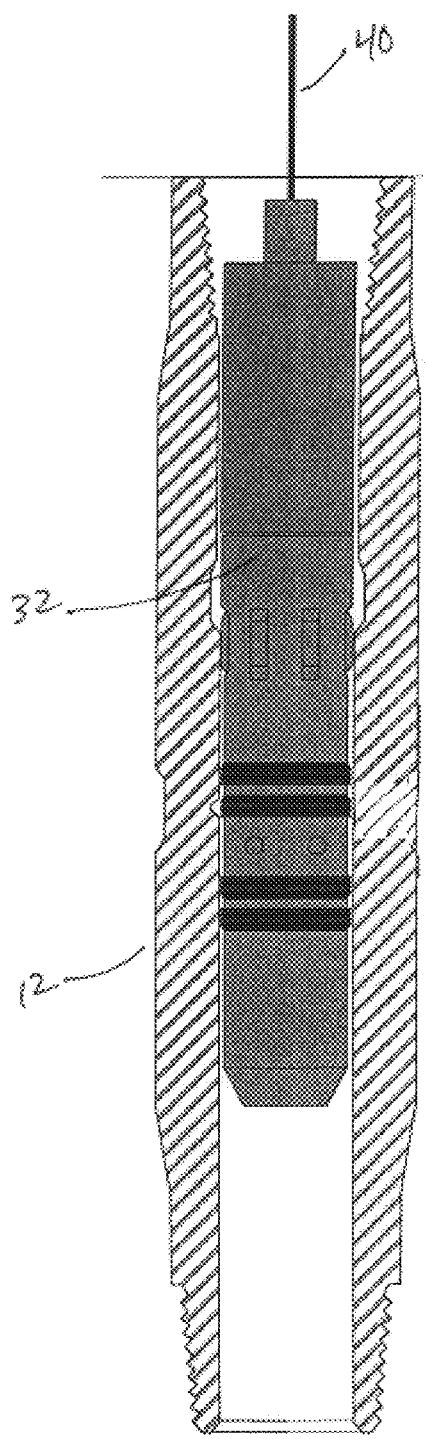
FIGS. 7A and 7B are cross-sectional views of a downhole tool in accordance with the invention in two different positions in a well, as a result of being raised or lowered on a wireline.
Figure 7B:
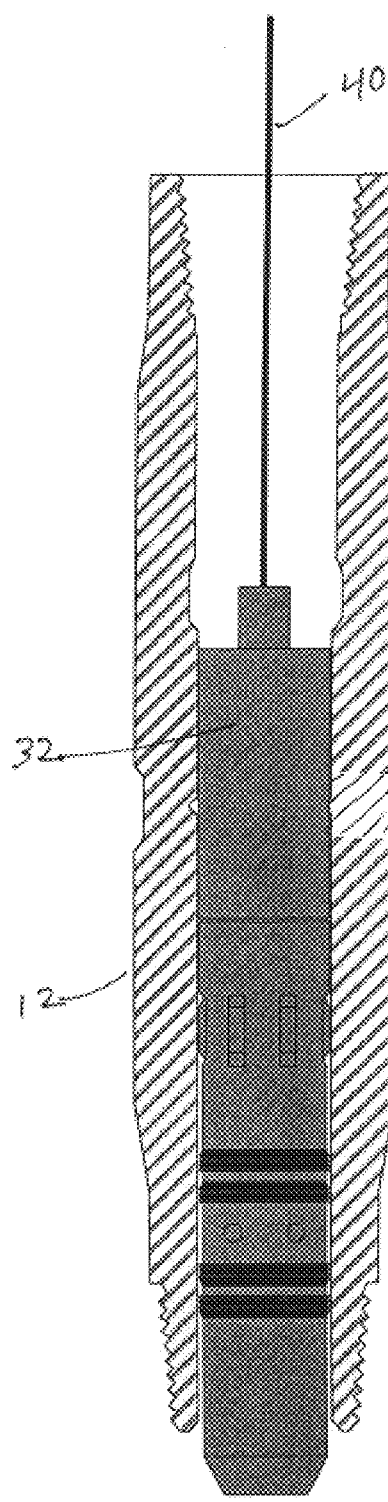

As mentioned above, the second downhole structure can be a downhole tool that is adapted to be raised or lowered in a wellbore. In order to do this, the downhole tool preferably is attached to a supporting structure 40, such as wireline, slickline, coiled tubing, and drillpipe. As shown in FIGS. 7A and 7B, the second downhole structure 32 can be moved to different depths within the borehole by raising or lowering this supporting structure 40.

Figure 8:
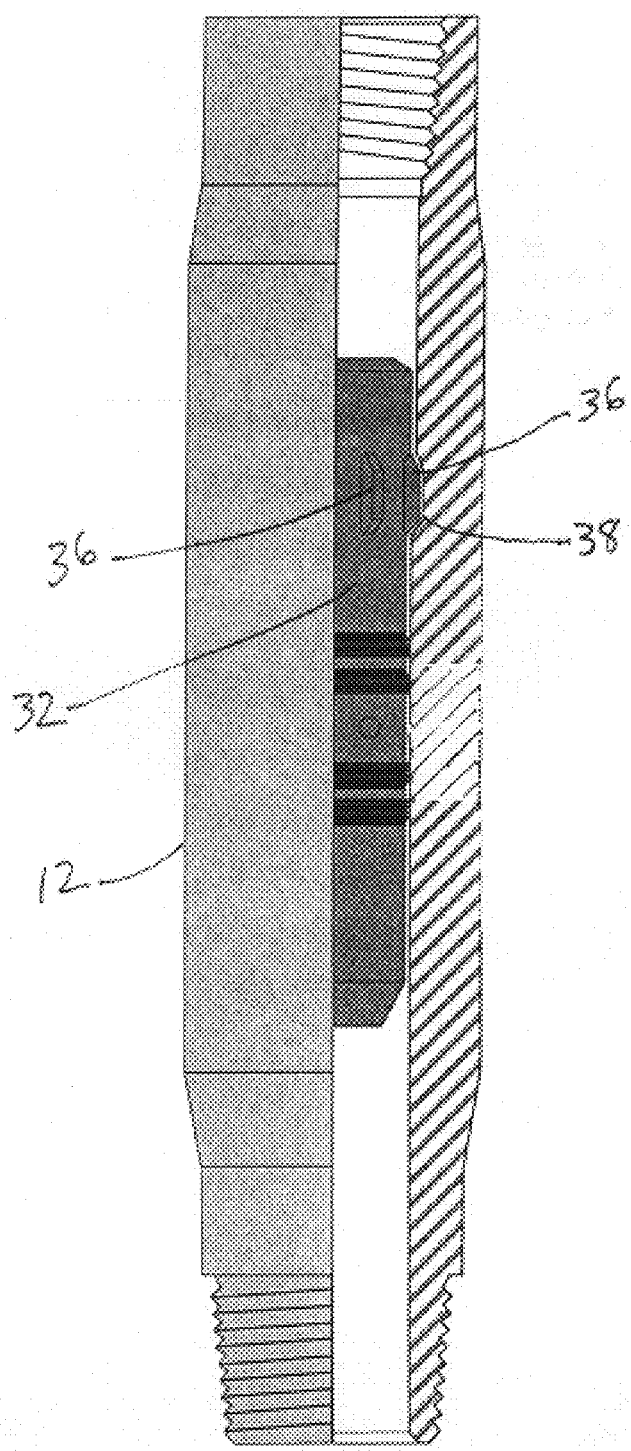
FIG. 8 is a cross-sectional view of a downhole tool in accordance with the present invention locked in place in a landing nipple.

One common type of actuation of a downhole tool that can occur in response to a match between the determined ID code and the target ID code comprises locking the second downhole structure in a fixed position relative to the first downhole structure. For example, locking protrusions 36 on the tool 32 can move outward into locking engagement with locking recesses 38 on the inner diameter of a landing nipple 12, as shown in FIG. 8.

In one embodiment of the invention, the identification code indicates at least the inner diameter of the tubular member, and the target identification code is predetermined to match the identification code of the desired size (e.g., inner diameter) tubular member in which the downhole becomes locked upon actuation. Thus, when the receiver unit in the second downhole structure determines that the ID code (and thus the inner diameter of the first downhole structure) matches the outer diameter of the locking means on the second downhole structure, the tool can actuate, thereby providing locking engagement of the tool and nipple. Similarly, the tool can actuate and provide unlocking engagement of the tool and nipple.

Figures 9A, 9B:
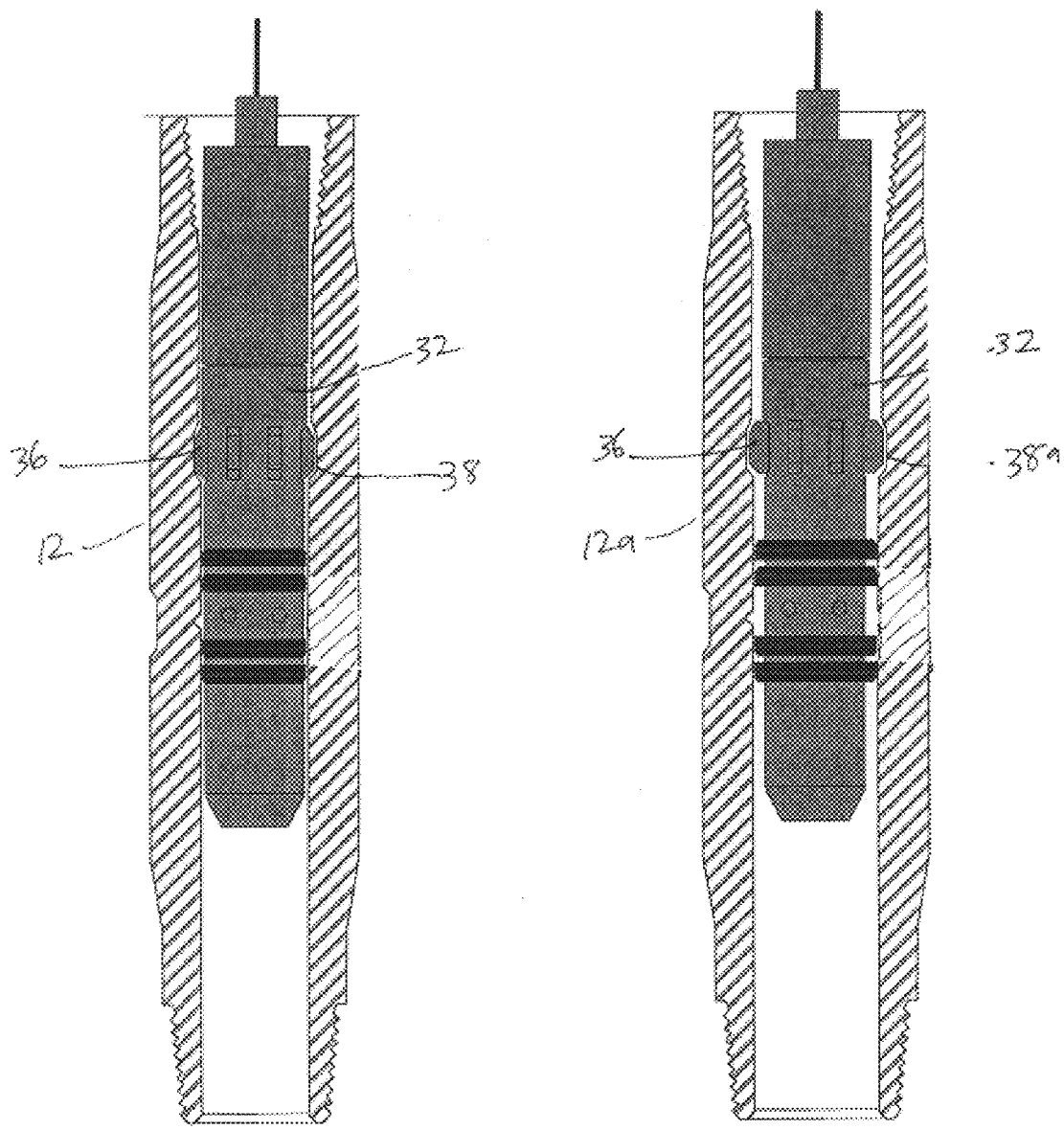
FIG. 9A is a cross-sectional view of a downhole tool installed in a landing nipple in accordance with the present invention.
FIG. 9B is a cross sectional view of the downhole tool of FIG. 9A installed in a landing nipple having a different inner diameter than that of FIG. 9A.

Another variation on this embodiment of the invention involves the use of a downhole tool that can adjust in size to fit the inner diameter of the tubular members having various inner diameters. In other words, this tool can morph in size to engage landing nipples of various sizes, as shown in FIGS. 9A and 9B. FIG. 9A shows a second downhole structure (i.e., downhole tool 32) locked in place in a landing nipple 12 by locking protrusions 36 that engage locking recesses 38. As shown in FIG. 9B, when this same downhole tool 32 is placed in the bore of a landing nipple 12a that has a larger inner diameter, the locking protrusions can be extended outwardly a greater distance to engage locking recesses 38a on the landing nipple 12a and thereby secure the tool 12a in a fixed position in the well. This further extension is actuated by the receiver unit in the second downhole structure determining the ID code (and thus the inner diameter of the first downhole structure) and the need for further extension of the locking protrusions 36. This allows the use of more standard equipment, and lessens the need to maintain an inventory of many different sizes and/or configurations of downhole equipment.

Figure 10:
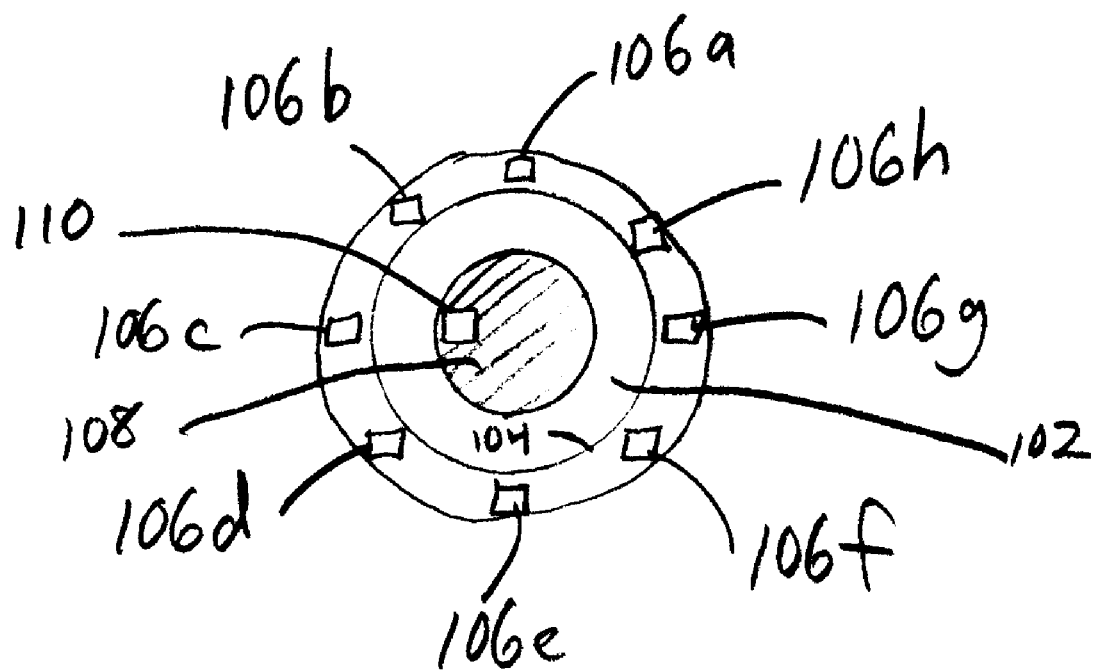
FIG. 10 is a top cross-sectional view of a tubular member and downhole tool in accordance with the present invention.

Yet another embodiment of the present invention is shown in FIG. 10. As in several of the previously described embodiments, the first downhole structure comprises a tubular member 100 having an axial bore 102 therethrough. The bore is defined by the inner surface of the tubular member, which has a generally circular inner diameter 104. The tubular comprises a plurality of radio frequency identification transmitter units 106a, 106b, 106c, 106d, 106e, 106f, 106g, and 106h spaced about its inner diameter, preferably in a single cross-sectional plane. As described above, each non-acoustic frequency identification transmitter transmits a non-acoustic frequency signal (e.g., a radio frequency signal) corresponding to a different identification code. When a second downhole structure, such as a downhole tool 108, is lowered into the bore 102 of the tubular member 100, the frequency receiver unit 110 located in or on the tool determines the identification code of the transmitter unit 106 that is closest to it, and thereby determines the orientation of the first downhole structure relative to second downhole structure in the wellbore.

Figure 11A:
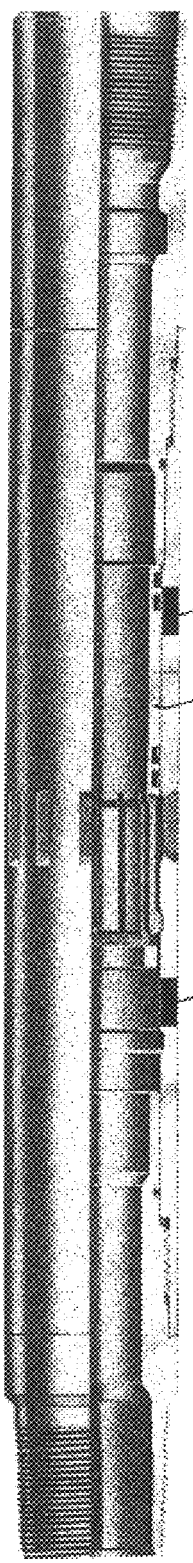
FIG. 11A is a cross-sectional view of a downhole tool that comprises a sliding sleeve, and a tubular housing member, in accordance with the present invention, with the sleeve in a first position.
Figure 11B:
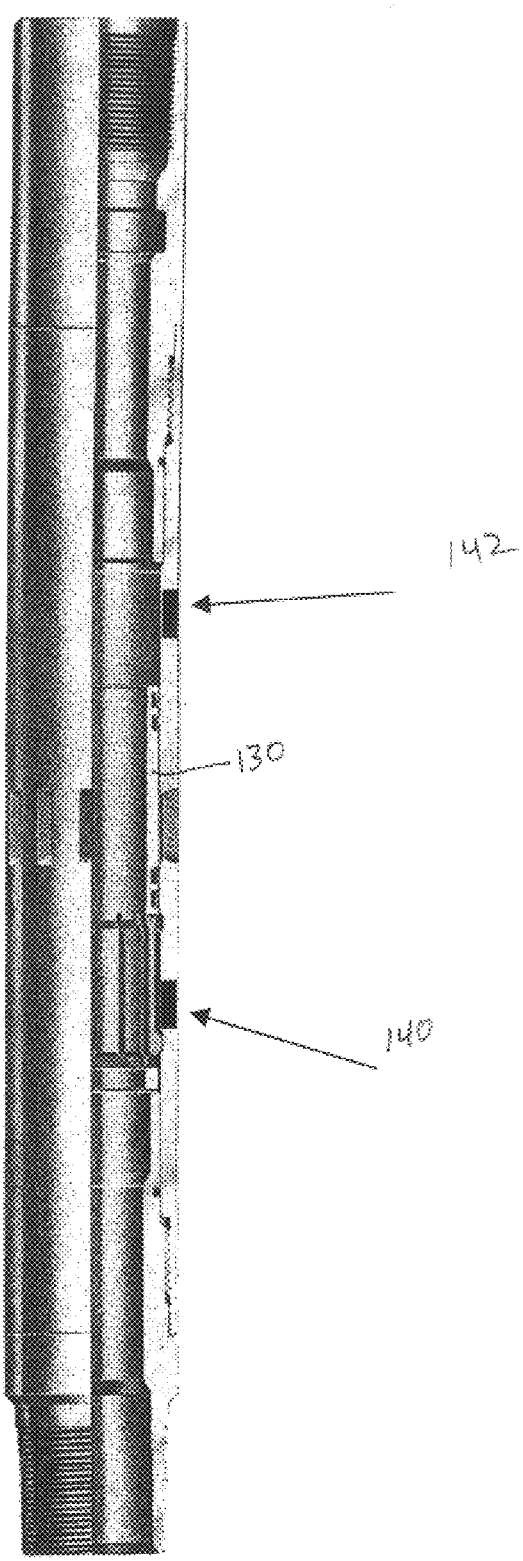
FIG. 11B is a cross-sectional view of a downhole tool that comprises a sliding sleeve, and a tubular housing member, in accordance with the present invention, with the sleeve in a second position.

Another embodiment of the invention is especially well suited for use with subsurface safety valves or other downhole equipment that comprises sliding sleeves, valve closure members, or other movable structures. In this embodiment, as shown in FIGS. 11A and 11B, the first downhole structure comprises a movable sleeve 130 or valve closure member which has a first position and a second position (e.g., open and closed positions shown in FIGS. 11A and 11B, respectively). The movable sleeve 130 exposes a first non-acoustic frequency identification transmitter unit 140 and occludes a second non-acoustic frequency identification transmitter unit 142 when the movable sleeve or valve closure member is in the first position (see FIG. 11A). The movable sleeve 130 occludes the first transmitter unit 140 and exposes the second transmitter unit 142 when the movable sleeve is in the second position (see FIG. 11B). A shifting tool can be used to move the movable sleeve 130 from the first position (see FIG. 11A) to the second position (see FIG. 11B). Similarly the movable sleeve 130 can be moved from the second position (see FIG. 11B) to the first position (see FIG. 11A). The first transmitter unit transmits a frequency signal corresponding to an identification code that is different than the signal and code for the second transmitter unit. Thus, the determined identification code can be used to determine whether a valve closure member is in the open or closed position, or to determine whether a movable sleeve is in the up or down position. This embodiment of the invention can provide a positive indication that actuation (e.g., of a subsurface safety valve) has occurred, and can guarantee that the valve is open or closed. Failsafe indications such as make before break or break before make as appropriate can be used to guarantee the correctness of this verification and indication information.

Figure 12:
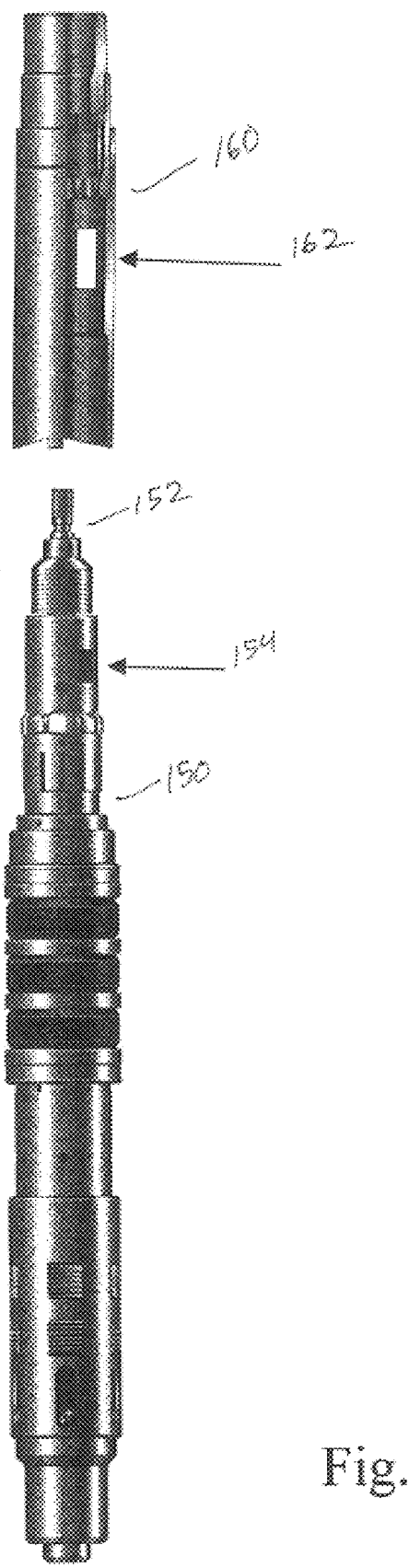
FIG. 12 is a cross-sectional view of a downhole tool having a fishing neck and a fishing tool in accordance with the present invention.

Another embodiment of the invention is especially useful when fishing for tools or parts thereof that have become detached from supporting structure in the borehole. In this embodiment, as shown in FIG. 12, the first downhole structure is a downhole tool 150 that comprises a fishing neck 152, and the non-acoustic frequency identification transmitter unit 154 is secured to the fishing neck. The second downhole structure is a fishing tool 160 having secured to it the non-acoustic frequency receiver unit 162. The identification code determined by the receiver unit can be used to determine when the fishing tool is in close enough physical proximity to the fishing neck, and thus can be used to actuate the fishing tool when it is in a suitable position for engaging the fish.

Another embodiment of the invention makes use of a detachable, autonomous tool that can be released from the end of a supporting structure (e.g., coiled tubing, wireline, or completion hardware) while downhole or uphole, to then do some desired operation in another part of the well (e.g., spaced horizontally and/or or vertically from the point at which the tool separates from the supporting structure). The tool can later seek the end of the supporting structure, for example to enable it to be reattached, by homing in on the signal response from a transmitter unit embedded in the end of the supporting structure. Also, the tool can act as a repeater, actuator, or information relay device.

Another embodiment of the invention makes use of multiple autonomous agents optimized for submersible operation in different density fluids. The agents may be autonomous tools, transmitters, or receivers. The first agent can transfer a signal command from its location of origin to the boundary of the first fluid to a second fluid. The second agent can receive the signal command in the second fluid and respond to the signal command (for example by retrieving information or executing the command). In addition, the second agent can transfer a signal back to the first agent. This relay of signal commands or information between autonomous agents optimized for submersible operation in different density fluids can use multiple autonomous agents and perform across multiple fluid interfaces. This relay of signal commands or information between autonomous agents can extend up or down-hole, between horizontal and vertical wellbores, and between multilateral wellbores and the main wellbore.

In summary, the present invention provides apparatus and methods for managing, classifying, identifying, controlling, maintaining, actuating, activating, deactivating, locating, and communicating with downhole tools, jewelry, nipples, valves, gas-lift mandrels, packers, slips, sleeves and guns. The invention allows downhole tools to actuate only at the correct time and location and/or in the correct manner.

Although the present invention could be highly useful in any context, its benefits could be enhanced by a central organization that issues non-acoustic frequency identification units (encoding equipment serial numbers) to manufacturers of downhole components. This organization could also maintain a database of downhole tool identification codes/serial numbers of all components manufactured. Such a list of serial numbers could be classified or partitioned to allow for easy identification of the type and rating of any particular downhole component. Non-acoustic frequency transmitter units can store and transmit a signal corresponding to very large serial number strings that are capable of accommodating all necessary classes and ratings of equipment.

Other suitable uses of the invention include packer landing verification.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method for actuating or installing downhole equipment in a wellbore, comprising the steps off:
   (a) providing, a first downhole structure that comprises an RF identification transmitter unit that stores an identification code and transmits an RF signal corresponding to the identification code;
   (b) providing a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is moveable in the wellbore;
   (c) placing the second downhole structure in close enough proximity to the first downhole structure so that the RF receiver unit can receive the RF signal transmitted by the RF identification transmitter unit;
   (d) comparing the identification code determined by the RF receiver unit to the target identification code; and
   (e) if the determined identification code matches the target identification code, actuating or installing one of the first downhole structure or second downhole structure in physical proximity to the other.

2. The method of claim 1, wherein the first downhole structure comprises a tubular member having a hollow axial bore therethrough and the RF identification transmitter unit secured thereto.

3. The method of claim 2, wherein the identification transmitter unit is imbedded in the tubular member.

4. The method of claim 1, wherein the first downhole structure is selected from the group consisting of landing nipples, gas lift mandrels, packers, casing, external casing packers, slotted liners, multi-laterals, slips, sleeves, and guns.

5. The method of claim 1, wherein a plurality of first downhole structures are secured at different depths in a subterranean wellbore.

6. The method of claim 1, wherein at least one first downhole structure is secured in a given location in a lateral borehole of a multilateral well and the second downhole structure is placed in proximity to the first downhole structure within the same lateral.

7. The method of claim 1, wherein at least one first downhole structure is secured in a given location in a first lateral borehole of a multilateral well, and at least one other first downhole structure is secured in a location in a second lateral borehole of the well.

8. The method of claim 7, wherein each of the first downhole structures comprises a tubular member having a hollow axial bore therethrough, and the identification transmitter unit is secured to the tubular member.

9. The method of claim 8, wherein the identification code of each first downhole structure is used to determine in which lateral borehole in the multilateral well the second downhole structure is located.

10. The method of claim 1, wherein the second downhole structure is selected from the group consisting of subsurface safety valves, gas lift valves, packers, perforating guns, expandable tubing, expandable screens, and flow control devices.

11. The method of claim 1, wherein a plurality of first downhole structures are located at different depths in a wellbore, each of the first downhole structures comprises a tubular member having a hollow axial bore therethrough and the RF identification transmitter unit secured thereto, and the determined identification code is used to determine the depth of the second downhole structure in the borehole.

12. The method of claim 11, wherein the plurality of tubular members are joints of completion tubing that are attached end to end.

13. The method of claim 12, wherein each identification transmitter is secured near one end of the respective joint of completion tubing.

14. The method of claim 11, wherein second downhole structure is a perforating gun, and the determined depth is used to determine when to fire the gun.

15. The method of claim 1, wherein a plurality of second downhole structures are located in a wellbore, each of the second downhole structures comprises a perforation and the RF identification transmitter unit is secured thereto.

16. The method of claim 1, wherein the second downhole structure comprises a perforation in a wellbore and the RF identification transmitter unit is secured therein.

17. The method of claim 1, wherein a plurality of second downhole structures are located in a formation, each of the second downhole structures comprises a fracture and the RF identification transmitter is present therein.

18. The method of claim 1, wherein the second downhole structure is a downhole tool that is attached to a supporting structure selected from the group consisting of wireline, slickline, coiled tubing, and drillpipe, and the second downhole structure is moved to different depths within the borehole by raising or lowering the supporting structure.

19. The method of claim 1, wherein the RF identification transmitter unit comprises a radio frequency transponder.

20. The method of claim 1, wherein the second downhole structure is a downhole tool that is actuated in response to a match between the determined identification code and the target identification code, and wherein the actuation comprises locking the second downhole structure in a fixed position relative to the first downhole structure.

21. The method of claim 20, wherein the first downhole structure comprises a tubular member having an axial bore therethrough and an inner surface, and further comprising a locking indentation in the inner surface, and wherein the second downhole structure engages the locking indentation when it is actuated.

22. The method of claim 21, wherein the identification code indicates at least the inner diameter of the tubular member, and the target identification code is predetermined to match the identification code of the tubular member in which the downhole becomes locked upon actuation.

23. The method of claim 22, wherein the downhole tool adjusts in size to fit the inner diameter of the tubular member.

24. The method of claim 1, wherein the first downhole structure comprises a tubular member having an axial bore therethrough, the bore having a generally circular inner diameter which is defined by the inner surface of the tubular member, and wherein the tubular comprises a plurality of RF identification transmitter units spaced about its inner diameter; wherein each RF identification transmitter transmits a signal corresponding to a different identification code; and wherein the identification codes are used to determine the orientation of one of the first downhole structure and second downhole structure.

25. The method of claim 1, wherein the first downhole structure comprises a movable sleeve or valve closure member which has a first position and a second position; wherein the movable sleeve or valve closure member exposes a first RF identification transmitter unit and occludes a second RF identification transmitter unit when the movable, sleeve or valve closure member is in the first position; and wherein the movable sleeve or valve closure member occludes the first RF, identification transmitter unit and exposes the second RF identification transmitter unit when the movable sleeve or valve closure member is in the second position.

26. The method of claim 25, wherein the first RF identification transmitter unit transmits a signal corresponding to a identification code that is different than the signal and code for the second RF identification transmitter unit, and the determined identification code is used to determine whether a valve closure member is in the open or closed position.

27. The method of claim 25, wherein the first identification transmitter unit transmits a signal corresponding to a identification code that is different than the signal and code for the second RF identification transmitter unit, and the determined identification code is used to determine whether a movable sleeve is in the up or down position.

28. The method of claim 1, wherein the first downhole structure is a downhole tool that comprises a fishing neck, and wherein the RF identification transmitter unit is secured to the fishing neck; and wherein the second downhole structure is a fishing tool having secured thereto the RF receiver unit.

29. The method of claim 27, wherein the determined identification code is used to determine when the fishing tool is in physical proximity to the fishing neck.

30. A downhole assembly comprising:
    a first downhole structure that comprises an RF identification transmitter unit that stores an identification code and transmits a signal corresponding to the identification code; and
    a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore; and
    wherein the assembly comprises apparatus for determining if the determined identification code matches the target identification code, and for actuating or installing one of the first downhole structure or second downhole structure in physical proximity to the other.

31. The assembly of claim 30, wherein the first downhole structure comprises a tubular member having a hollow axial bore therethrough and the RF identification transmitter unit secured thereto.

32. The assembly of claim 31, wherein the identification transmitter unit is imbedded in the tubular member.

33. A downhole assembly, comprising:
    a first downhole structure that comprises an RF identification transmitter unit that stores an identification code and transmits a signal corresponding to the identification code; and
    a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore;
    wherein the first downhole structure is selected from the group consisting of landing nipples, gas lift mandrels, packers, casing, external casing packers, slotted liners, multi-laterals, slips, sleeves, and guns.

34. The assembly of claim 30, comprising a plurality of first downhole structures secured at different depths in a subterranean wellbore.

35. The assembly of claim 30, wherein at least one first downhole structure is secured in a given location in a first lateral borehole of a multilateral well, and at least one other first downhole structure is secured in a location in a second lateral borehole of the well.

36. The assembly of claim 35, wherein each of the first downhole structures comprises a tubular member having a hollow axial bore therethrough, and the identification transmitter unit is secured to the tubular member.

37. The assembly of claim 30, wherein the second downhole structure is a downhole tool that is attached to a supporting structure selected from the group consisting of wireline, slickline, coiled tubing, and drillpipe, and the second downhole structure can be moved to different depths within the borehole by raising or lowering the supporting structure.

38. The assembly of claim 30, wherein the RF identification transmitter unit comprises a radio frequency transponder.

39. A downhole assembly, comprising:

a first downhole structure that comprises an RF identification transmitter unit that stores an identification code and transmits a signal corresponding, to the identification code; and a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore;

wherein the second downhole structure is a downhole tool that is actuated in response to a match between the determined identification code and the target identification code, and wherein the actuation comprises locking the second downhole structure in a fixed position relative to the first downhole structure.

40. The assembly of claim 39, wherein the first downhole structure comprises a tubular member having an axial bore therethrough and an inner surface, and further comprising a locking indentation in the inner surface, and wherein the second downhole structure engages the locking indentation when it is actuated.

41. The assembly of claim 40, wherein the identification code indicates at least the inner diameter of the tubular member, and the target identification code is predetermined to match the identification code of the tubular member in which the downhole becomes locked upon actuation.

42. The assembly of claim 41, wherein the downhole tool is capable of adjusting in size to fit the inner diameter of the tubular member.

43. A downhole assembly, comprising:

a first downhole structure that comprises an RF identification transmitter unit that stores an identification code and transmits a signal corresponding to the identification code; and a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore;

wherein the first downhole structure comprises a tubular member having an axial bore therethrough, the bore having a generally circular inner diameter which is defined by the inner surface of the tubular member, and wherein the tubular comprises a plurality of RF identification transmitter units spaced about its inner diameter; wherein each RF identification transmitter transmits a signal corresponding to a different identification code; and wherein the identification codes can be used to determine the orientation of one of the first downhole structure and second downhole structure.

44. A downhole assembly, comprising:

a first downhole structure that comprises an RF identification transmitter unit that stores an identification code and transmits a signal corresponding to the identification code; and a second downhole structure that comprises an RF receiver unit that can receive the signal transmitted by the identification transmitter unit, decode the signal to determine the identification code corresponding thereto, and compare the identification code to a preset target identification code; wherein one of the first downhole structure and the second downhole structure is secured at a given location in a subterranean wellbore, and the other is movable in the wellbore;

wherein the first downhole structure comprises a movable sleeve or valve closure member which has a first position and a second position; wherein the movable sleeve or valve closure member exposes a first RF identification transmitter unit and occludes a second RF identification transmitter unit when the movable sleeve or valve closure member is in the first position; and wherein the movable sleeve or valve closure, member occludes the first RF identification transmitter unit and exposes the second RF identification transmitter unit when the movable sleeve or valve closure member is in the second position.

45. The assembly of claim 44, wherein the first RF identification transmitter unit transmits a signal corresponding to a identification code that is different than the signal and code for the second RF identification transmitter unit, and the determined identification code can be used to determine whether a valve closure member is in the open or closed position.

46. The assembly of claim 44, wherein the first RF identification transmitter unit transmits a signal corresponding to a identification code that is different than the signal and code for the second RF identification transmitter unit, and the determined identification code can be used to determine whether a movable sleeve is in the up or down position.

47. A downhole assembly, comprising:

a first downhole structure that comprises an RF identification transmitter unit that stores an identification code and transmits a signal corresponding to the identification code; and a second downhole structure that comprises an RF receiver unit that can receive the signal transmitted by the identification transmitter unit, decode the signal to determine, the identification code corresponding thereto, and compare the identification code to a preset target identification code; wherein one of the first downhole structure and the second downhole structure is secured at a given location in a subterranean wellbore, and the other is movable in the wellbore;

wherein the first downhole structure is a downhole tool that comprises a fishing neck, and wherein the RF identification transmitter unit is secured to the fishing neck; and wherein the second downhole structure is a fishing tool having secured thereto the RF receiver unit.

48. A method of inventorying a plurality of downhole structures in a subterranean well, comprising the steps of:

(a) providing in a wellbore a plurality of first downhole structures having RF identification transmitter units therein;

(b) passing at least one second downhole structure through at least a part of the wellbore in proximity to a plurality of the RF identification transmitter units, wherein the second downhole structure comprises a RF receiver unit that receives the signal transmitted by the identification transmitter units, decodes the signals to determine the identification codes corresponding thereto, and stores the identification codes in memory;

(c) using the identification codes read from the database to perform at least one operation selected from the group consisting of actuating, activating, and deactivating with at least one downhole structure in the well.

* * * * *

Adverse Decisions in Interference

Patent No. 6,333,700, Hubertus V. Thomeer, and Sarmad Adnan, APPARATUS AND METHOD FOR DOWNHOLE WELL EQUIPMENT AND PROCESS MANAGEMENT, IDENTIFICATION, AND ACTUATION, Interference No. 105,466, final judgment adverse to the patentees rendered November 21, 2006, as to claims 1-14.

*(Official Gazette March 20, 2007)*